United States Patent [19]

Zama

[11] Patent Number: 4,768,042

[45] Date of Patent: Aug. 30, 1988

[54] THERMOSENSITIVE GRADATION PRINTER

[75] Inventor: Hiroyoshi Zama, Soma, Japan

[73] Assignee: Alps Electric Co., Ltd., Japan

[21] Appl. No.: 9,792

[22] Filed: Feb. 2, 1987

[30] Foreign Application Priority Data

May 6, 1986 [JP] Japan .................................. 61-104430

[51] Int. Cl.$^4$ ......................... G01D 15/10; H04N 1/23
[52] U.S. Cl. .................................. 346/76 PH; 358/298
[58] Field of Search ......................... 346/76 PH, 76 R; 430/293, 348; 358/298

[56] References Cited

U.S. PATENT DOCUMENTS

| | | | |
|---|---|---|---|
| 3,813,677 | 5/1974 | Shimotsuma | 346/76 R |
| 4,249,186 | 2/1981 | Edwards | 346/35 |
| 4,401,993 | 8/1983 | Moriguchi et al. | 346/76 PH |
| 4,679,055 | 7/1987 | Inui et al. | 346/76 PH |

Primary Examiner—E. A. Goldberg
Assistant Examiner—Gerald E. Preston
Attorney, Agent, or Firm—Guy W. Shoup; Leighton K. Chong; Paul J. Winters

[57] ABSTRACT

A gradation printer feeds heat-sensitive paper at a constant speed and varies the heating time and hence, the coloring area depending upon printing dots, thereby representing a shading pattern by a multiplicity of printing dots having different densities. If the number of density degradations is N, and the heating time for producing the coloring area of the maximum density gradation is T, the heating time for producing a coloring area which corresponds to each density gradation is obtained by multiplying $T/(N-1)$ by an integer, and the heating times which correspond to the respective density gradations are arranged at substantially regular intervals with the time $T/2$ as the center, the time $T/2$ being the point at which $T/2$ has elapsed from the start of the heating time T.

1 Claim, 4 Drawing Sheets

THERMOSENSITIVE GRADATION PRINTER

BACKGROUND OF THE INVENTION

1. Field of the Invention

The present invention relates to a gradation printer for recording, for example, an image with a shading pattern by using a thermal printer.

2. Description of the Prior Art

Gradation printers are used as a terminal appliance of a captain system, INS, etc to hard copy supplied data. Such gradation printers represent picture data as a shading pattern by means of a matrix of printing dots.

A conventional gradation recording system for controlling the density of the printing dots will be explained with reference to a gradation printer using a thermal head shown in FIGS. 4 and 5.

In such a gradation recording system, heat-sensitive paper fed at a constant speed is colored by heat sensitization of a thermal head, and the density of a printing dot is represented by varying the coloring area by controlling the period for which the thermal head is driven in correspondence with the density gradation. For example, it is assumed that the printing time for one line of the gradation printer is T, and that N density gradations are recorded. If the thermal head is driven for the entire period of the printing time T, the coloring area of the printing dots occupies the maximum area of the printing space, thereby producing the maximum density gradation. On the other hand, if the thermal head is not driven at all in this period, the coloring area becomes zero, thereby producing the minimum density gradation, namely, the color being equal to the ground color of the white paper. If the printing time T is divided into (N−1), and the divided printing time is t, the formula $t = T/(n-1)$ holds. A part of the printing space is colored by driving the thermal head by a period $0, t, 2t, \ldots,$ or $(N-1)t$, which is obtained by multiplying t by an integer in accordance with the density degradation. The reason why T is divided into (N−1) is that one of the N gradations is white which does not need to be colored.

In a conventional 8-density gradation recording system, one printing time is divided into seven periods from t1 to t7, as shown in FIG. 5, and driving data from D11 to D 18 are supplied to the thermal head in accordance with the respective density gradation when a signal ENB for driving the thermal head is turned on. Current is applied to color the heat-sensitive paper during the period in which these driving data are at a high level. Since the heat-sensitive paper is fed at a constant speed, the coloring portion having the area corresponding to the period in which current is applied to the thermal head is formed from the top of the printing space, as shown in FIG. 4.

In this way, the density of each printing dot is represented by the size of the coloring area, and the matrix of such printing dots record the density gradation of one image as a shading pattern.

However, in the above-described conventional density gradation recording system, since the coloring portion of any density gradation is formed from the top of the printing space when the signal ENB is turned on, the density represented by a printing dot is sometimes mistakenly recognized as a different gradation in the image. For example, as shown in FIG. 6, when printing dots 9, 10 and 11 are arranged in the direction in which the heat-sensitive paper is fed, and if the density gradations of the printing dots 9, 10 and 11 are 8, 2 and 8, respectively, the coloring position of the printing dot 10 is not located at the center of the printing dots 9 and 11 but is located in proximity to the printing dot 9. Therefore, the blank portion between the printing dots 10 and 11 becomes large, which causes mistaken recognition of the gradation of the image when it is observed as a whole.

SUMMARY OF THE INVENTION

Accordingly, it is an object of the present invention to eliminate the above-described problem of the gradation recording of a conventional gradation printer, and to provide a gradation printer which is free from the unevenness of density by locating the coloring portion of each printing dot which has the area corresponding to each density gradation at the center of the printing space.

To achieve this aim, the present invention provides a gradation printer which feeds heat-sensitive paper at a constant speed, varies the heating time and hence, the coloring area depending upon printing dots, and represents a shading pattern by a multiplicity of printing dots having different densities. If the number of density degradations is N, and the heating time for producing the coloring area of the maximum density gradation is T, the heating time for producing a coloring area which corresponds to each density gradation is obtained by multiplying $T/(N-1)$ by an integer, and the heating times which correspond to the respective density gradations are arranged at substantially regular intervals with the time T/2 as the center, the time T/2 being the point at which T/2 has elapsed from the start of the heating time T.

As described above, the heat-sensitive paper is fed at a constant speed and the heating times which correspond to the respective density gradations are arranged at substantially regular intervals with the time T/2 as the center, the time T/2 being the point at which T/2 has elapsed from the start of the heating time T, the coloring area of each printing dot which corresponds to each density gradation is arranged at the center of the printing space, so that each blank portion between the adjacent printing dots becomes uniform in the direction in which the heat-sensitive paper is fed.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
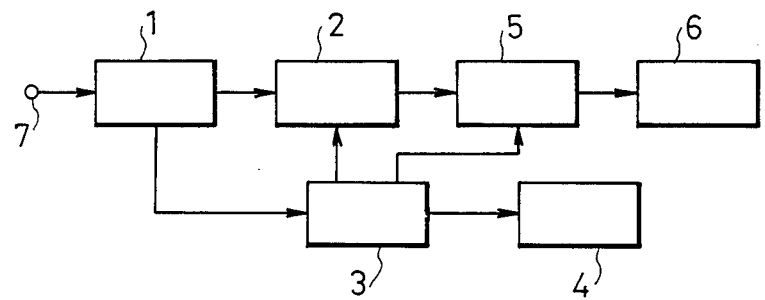
FIG. 1 is a block diagram showing the structure of an embodiment of a gradation printer according to the present invention.
Figure 2:
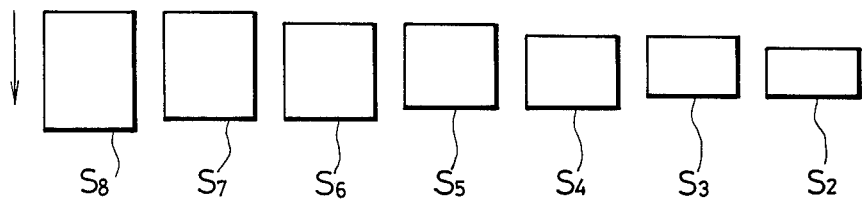
FIG. 2 shows the coloring area at each density gradation of a printing dot of a gradation printer according to the present invention and the arrangement of the coloring areas.
Figure 4:
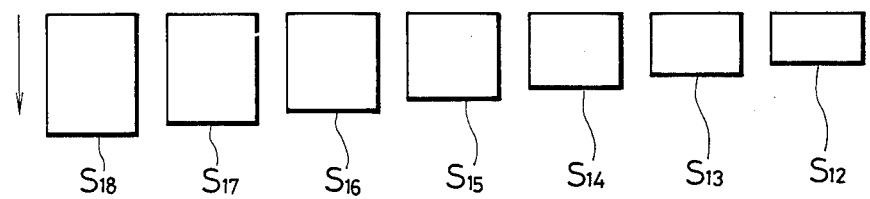
FIG. 4 shows the coloring area at each density gradation of a printing dot of a conventional gradation printer and the arrangement the coloring areas.
Figure 3:
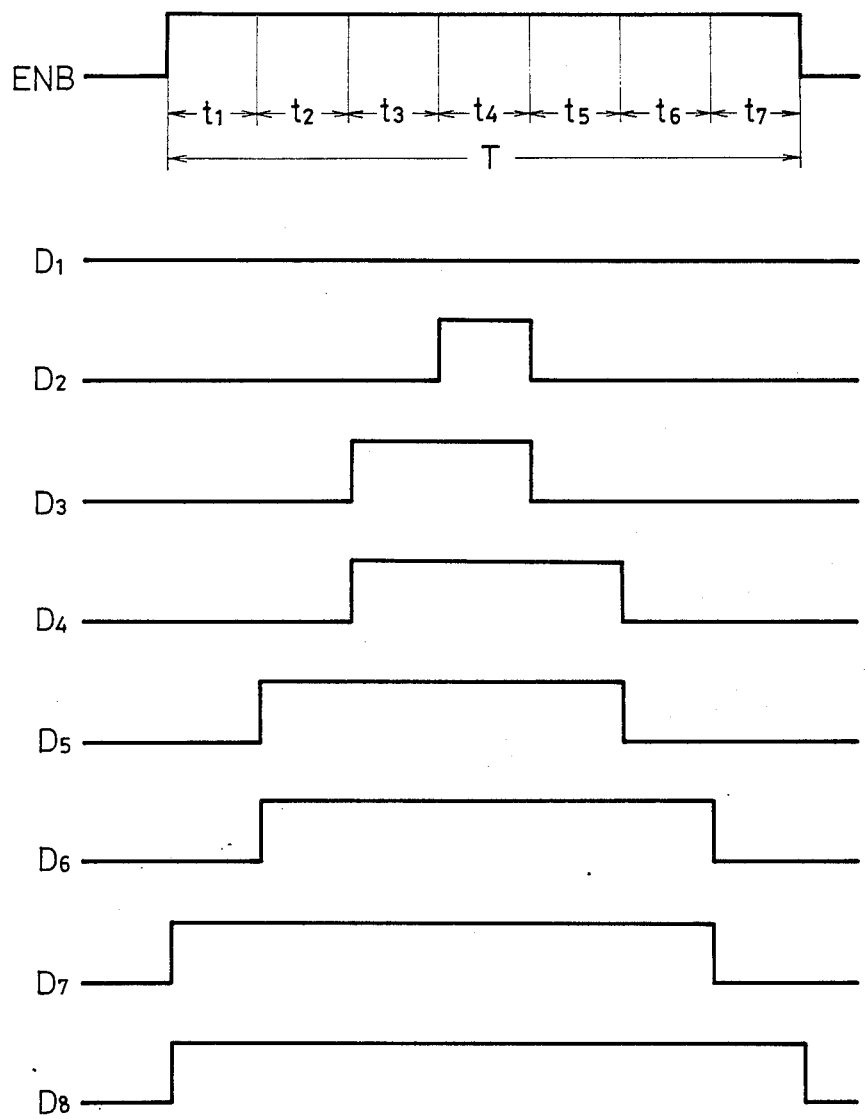
FIG. 3 is a time chart showing the driving data of a gradation printer according to the present invention.
Figure 5:
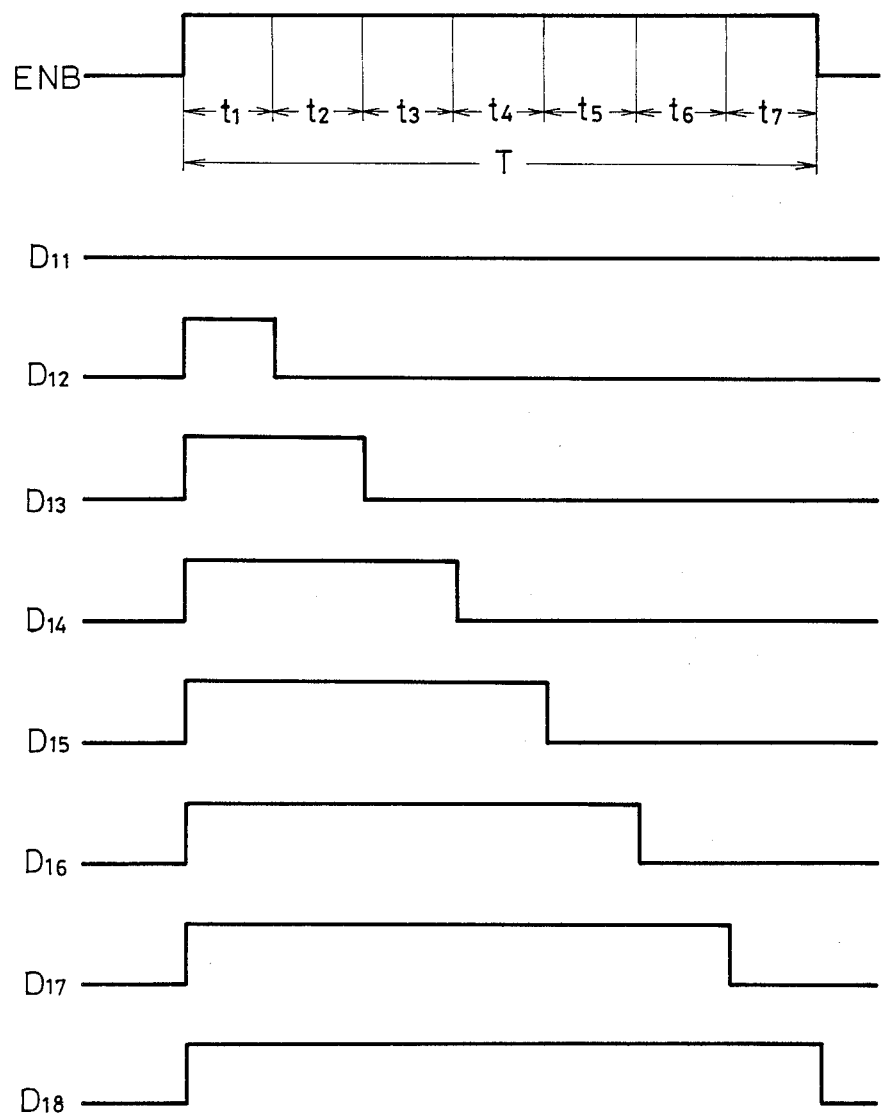
FIG. 5 is a time chart showing the driving data of a conventional printer.
Figure 6:
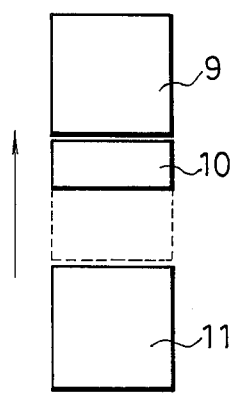
FIG. 6 explains unevenness of density of conventional printing dots.

An embodiment of the present invention will be explained hereinunder with reference to FIGS. 1 to 3. FIG. 1 is a block diagram of an embodiment of a gradation printer according to the present invention, FIG. 2 shows the coloring area at each density gradation of a printing dot of a gradation printer according to the present invention and the arrangement of the coloring area, and FIG. 3 is a time chart showing the driving data of a gradation printer according to the present invention.

In FIG. 1, a printing data is input from a terminal 7 through an interface circuit 1, and a control circuit 3 drives a motor 4 by the command for printing operation, thereby feeding heat-sensitive paper at a constant speed. The printing data is also converted to a driving data for gradation recording such as that shown in FIG. 3 by a data conversion circuit 2 and is supplied to a head driving circuit 5 to the head 6. Current is then applied for the period which corresponds to the driving data to color the heat-sensitive paper and print it. A signal ENB is supplied from the control circuit 3 to the data conversion circuit 2 and the head driving circuit 5 to maintain synchronization.

Driving data D1 to D8 for density gradation recording shown in FIG. 3 will now be explained in detail. If it is assumed that one printing time which is controlled by the signal ENB is T and printing is performed in N density gradations, the printing time T is divided into (N−1). And one of the divided printing time is assumed to be t. This relationship is represented by $t = T/(N-1)$. If printing is performed in 8 density gradations, the printing time T is divided into 7, from t1 to t7. The driving data D2 representing the second density gradation reaches a high level during the period t4, which is the middle of the printing time T. The driving data D3 representing the third density gradation reaches a high level during the periods t3 and t4, and the driving data D4 representing the fourth density gradation reaches a high level during the periods of t3, t4 and t5. Similarly, from the driving data D5 to D7, which represents the seventh density gradation, they form respective high levels which are arranged substantially equally before and after the period t4, which is at the center, during the respective periods. The driving data D8, which represents the maximum density gradation, namely, the eighth gradation maintains a high level all through the periods from t1 to t7, while the driving data D1, which represents the first density gradation, maintains a low level all through the periods.

The areas of the coloring portions S2 to S8 of the heat-sensitive paper are varied in accordance with the density gradations by the printing dots which are driven on the basis of the driving data D2 to D8, but the center of the coloring portion is always situated substantially at the center of the printing space.

As described above, according to a gradation printer of the present invention, the center of the coloring portion which varies in accordance with the density gradation of a printing dot is situated substantially at the center of the printing space, so that the blank portions between the adjacent printing dots become uniform. Accordingly, the density is correctly recognized when an image is observed as a whole, and high-quality density gradation recording without any unevenness is advantageously realized.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. In a gradation printer of the type having:
   at least one thermal element for printing successive dots on a heat sensitive paper which is moved in a sheet feeding direction with respect to said at least one thermal element,
   feeding means for feeding the heat sensitive paper at a constant speed in the sheet feeding direction in contact with said thermal element, and
   current applying means for applying current for a selected heating time $t_i$ to said thermal element while the paper is fed at a constant speed by said feeding means so as to form a dot which is colored over an area extending a length in the sheet feeding direction which corresponds to the length of time $t_i$ of heating of said the thermal element on the heat sensitive paper, whereby the coloring area for each dot position can be varied over a plurality N of colored area gradations by N different lengths of heating times $t_i$ extending from 0 to a maximum time T in increments of $T/(N-1)$,
   the improvement comprising:
   control means for controlling the onset and end of each of the heating times $t_i$ such that each corresponding colored area is substantially centered on the paper relative to a position corresponding to the time $T/2$ in the sheet feeding direction, whereby a succession of differently graded dots formed by said at least one thermal element in the sheet feeding direction can be more clearly distinguished from each other, thereby resulting in an improved gradation printing.

* * * * *